(12) United States Patent
Contreras et al.

(10) Patent No.: US 8,179,633 B2
(45) Date of Patent: *May 15, 2012

(54) PERPENDICULAR MAGNETIC RECORDING SYSTEM AND WRITE HEAD WITH TRANSVERSE AUXILIARY POLE FOR FAST SWITCHING OF WRITE POLE MAGNETIZATION

(75) Inventors: John Thomas Contreras, Palo Alto, CA (US); Manfred Ernst Schabes, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 334 days.

This patent is subject to a terminal disclaimer.

(21) Appl. No.: 12/549,410

(22) Filed: Aug. 28, 2009

(65) Prior Publication Data
US 2011/0051288 A1 Mar. 3, 2011

(51) Int. Cl.
*G11B 5/17* (2006.01)

(52) U.S. Cl. ......... 360/123.06; 360/123.02; 360/123.03; 360/123.05

(58) Field of Classification Search ................. None
See application file for complete search history.

(56) References Cited

U.S. PATENT DOCUMENTS

| | | | |
|---|---|---|---|
| 5,661,612 A | 8/1997 | Hasegawa et al. | |
| 5,869,988 A | 2/1999 | Jusuf et al. | |
| 6,219,193 B1 | 4/2001 | Janz | |
| 6,349,009 B1 | 2/2002 | Dakroub et al. | |
| 6,775,099 B2 | 8/2004 | Kuroda et al. | |
| 6,785,092 B2 | 8/2004 | Covington et al. | |
| 6,816,339 B1 | 11/2004 | Litvinov et al. | |
| 6,913,704 B2 | 7/2005 | Hsiao et al. | |
| 6,954,331 B2 | 10/2005 | Crawford et al. | |
| 7,002,775 B2 | 2/2006 | Hsu et al. | |
| 7,070,716 B2 | 7/2006 | Lam | |
| 7,072,142 B2 | 7/2006 | Lam | |
| 7,237,320 B2 | 7/2007 | Lam | |

(Continued)

FOREIGN PATENT DOCUMENTS

JP 59060722 A1 4/1984

(Continued)

OTHER PUBLICATIONS

J.G. Zhu et al., "Microwave assisted recording", IEEE Trans. Mag. (2008), pp. 125-131.

(Continued)

*Primary Examiner* — Kevin Bernatz
(74) *Attorney, Agent, or Firm* — Thomas R. Berthold

(57) ABSTRACT

A perpendicular magnetic recording system has a write head having a main coil (the write coil) and main pole (the write pole) that directs write flux in a direction perpendicular to the recording layer in the magnetic recording medium, and a transverse auxiliary pole (TAP) that injects auxiliary magnetic flux into the write pole at an angle to the primary or perpendicular axis of the write pole. The additional flux from the TAP, which is injected non-parallel to the primary magnetization of the write pole, exerts a torque on the magnetization of the write pole, thereby facilitating magnetization reversal of the write pole. The TAP is coupled to the main coil but not electrically connected to it. A separate passive coil, not electrically connected to the main coil, may be wrapped as a loop around the main pole and the TAP. Alternatively, the TAP may be located near one of the electrically conductive turns of the main coil.

12 Claims, 11 Drawing Sheets

U.S. PATENT DOCUMENTS

| | | |
|---|---|---|
| 7,256,955 B2 | 8/2007 | Pokhil et al. |
| 7,397,633 B2 | 7/2008 | Xue et al. |
| 2002/0030928 A1 | 3/2002 | Hsiao et al. |
| 2006/0054699 A1 | 3/2006 | Osterweil |
| 2007/0253106 A1 | 11/2007 | Sato et al. |
| 2008/0112078 A1 | 5/2008 | Hsiao et al. |
| 2008/0112080 A1 | 5/2008 | Lengsfield et al. |
| 2008/0112087 A1 | 5/2008 | Clinton et al. |
| 2008/0117545 A1 | 5/2008 | Batra et al. |
| 2008/0137224 A1 | 6/2008 | Gao et al. |
| 2008/0151436 A1 | 6/2008 | Sato et al. |
| 2008/0186628 A1 | 8/2008 | Hsiao et al. |
| 2008/0273268 A1 | 11/2008 | Hsiao et al. |
| 2010/0254041 A1* | 10/2010 | Alex et al. ................ 360/123.02 |
| 2010/0254042 A1* | 10/2010 | Contreras et al. ........ 360/123.05 |
| 2011/0038080 A1* | 2/2011 | Alex et al. ................ 360/123.02 |

FOREIGN PATENT DOCUMENTS

| | | |
|---|---|---|
| JP | 2001202601 A1 | 7/2001 |
| JP | 2004227709 A1 | 8/2004 |

OTHER PUBLICATIONS

Kittel C., "On the Theory of Ferromagnetic Resonance Absorption", Phys. Rev. 73, p. 155-161 (1948).

* cited by examiner

PERPENDICULAR MAGNETIC RECORDING SYSTEM AND WRITE HEAD WITH TRANSVERSE AUXILIARY POLE FOR FAST SWITCHING OF WRITE POLE MAGNETIZATION

BACKGROUND OF THE INVENTION

1. Field of the Invention

This invention relates generally to perpendicular magnetic recording systems, and more particularly to a system with fast switching of the magnetization direction of the perpendicular write head.

2. Description of the Related Art

Perpendicular magnetic recording, wherein the recorded bits are stored in a perpendicular or out-of-plane orientation in the recording layer, allows for ultra-high recording densities in magnetic recording hard disk drives. The write head must be able to write data not only at high bit-density but also at high data-rates. The write speed is particularly important in enterprise disk drives. However, the switching time for the main pole of the write head to switch from one magnetization direction to the other is a limiting factor as the data rate is increased. At high data-rates, the available magnetic flux from the write head, as seen by the recording layer on the disk, is dominated by the low-frequency flux output of the write head. The reason for such loss of write flux includes a slow intrinsic time-constant of the magnetization reversal in the main pole of the write head. Also, lower data-rate systems still require additional overshoot of the write current from the disk drive's write driver circuitry to aid in the magnetization reversal. This additional overshoot requires additional power from the write driver circuitry.

Perpendicular magnetic recording systems with high-frequency assisted writing have been proposed, as described in U.S. Pat. Nos. 6,816,339 B1 and 7,256,955 B2. In these proposed systems, the write coil generates the main perpendicular write field as well as a high-frequency auxiliary field. The auxiliary field has a frequency close to the resonance frequency of the magnetic grains in the recording layer to facilitate the switching of the magnetization of the grains. US 2007/0253106 A1 describes a high-frequency assisted writing system where an auxiliary coil is used to apply the high-frequency auxiliary field to the magnetic grains of the recording layer.

Pending application Ser. No. 12/419,278 filed Apr. 6, 2009 and assigned to the same assignee as this application discloses a perpendicular magnetic recording system with an auxiliary coil and auxiliary pole that injects magnetic flux into the write pole at an angle to the primary or perpendicular axis of the write pole. The additional flux from the auxiliary pole, which is injected non-parallel to the primary magnetization of the write pole, exerts a torque on the magnetization of the write pole, thereby facilitating magnetization reversal of the write pole. The auxiliary coil is electrically coupled to the main coil by circuitry that energizes the auxiliary coil so that the auxiliary pole generates the auxiliary flux simultaneous with the switching of the magnetization of the write pole.

Thus for both high data-rate and lower data-rate magnetic recording, what is needed is a write head and system that reduces the magnetization reversal time of the main pole and overshoot for the main pole without the application of a separately generated high-frequency auxiliary field to the recording layer, and without the need for an auxiliary coil and additional circuitry.

SUMMARY OF THE INVENTION

The invention relates to a perpendicular magnetic recording system with a write head having a main coil (the write coil) and main pole (the write pole) that directs write flux in a direction perpendicular to the recording layer in the magnetic recording medium, and a transverse auxiliary pole (TAP) that injects auxiliary magnetic flux into the write pole at an angle to the primary or perpendicular axis of the write pole. The additional flux from the TAP, which is injected non-parallel to the primary magnetization of the write pole, exerts a relatively large torque on the magnetization of the write pole, thereby facilitating magnetization reversal of the write pole. The TAP has its longitudinal axis oriented at an angle (greater than 15 degrees) and preferably substantially orthogonal (70 to 90 degrees) to the primary or perpendicular axis of the write pole.

The TAP is magnetically coupled to the main coil but not electrically connected to it. In one embodiment, a separate passive coil or winding, not electrically (i.e., conductively) connected to the main coil, is wrapped as a loop around the main pole and the TAP. When write current passes through the main coil the write field induced in the main pole induces current in the passive coil, which induces a field in the TAP which is directed substantially orthogonal to the main pole. In another embodiment the TAP is located near one of the electrically conductive turns of the main coil. When write current passes through the main coil the current in the conductive turn near the TAP has an associated field surrounding the conductor (called the "Amperian" field), which is directed to the TAP and substantially orthogonal to the main pole.

The auxiliary magnetic field from the TAP applies a torque on the magnetization of the magnetic material of the write pole which causes the magnetic moment to process. While auxiliary fields with frequency components close to the ferromagnetic resonance frequency of the main write pole are most effectively coupled to the magnetization of the write pole, an auxiliary field with a frequency lower than the ferromagnetic resonance frequency will also contribute to the switching of the magnetization of the write pole when applied at appreciable angles relative to the main direction of the magnetic anisotropy of the write pole. If the auxiliary field is at a frequency less than the ferromagnetic resonance frequency, the beneficial effect of the auxiliary field on the switching of the magnetization of the write pole will be dominated by the increase of the magnetic reversal torque in proportion to $\sin(\theta)$, where $\theta$ is the angle between the local direction of the total field from the main pole and the TAP and the local direction of the magnetization of the write pole.

For a fuller understanding of the nature and advantages of the present invention, reference should be made to the following detailed description taken together with the accompanying figures.

DETAILED DESCRIPTION OF THE INVENTION

Figure 1:
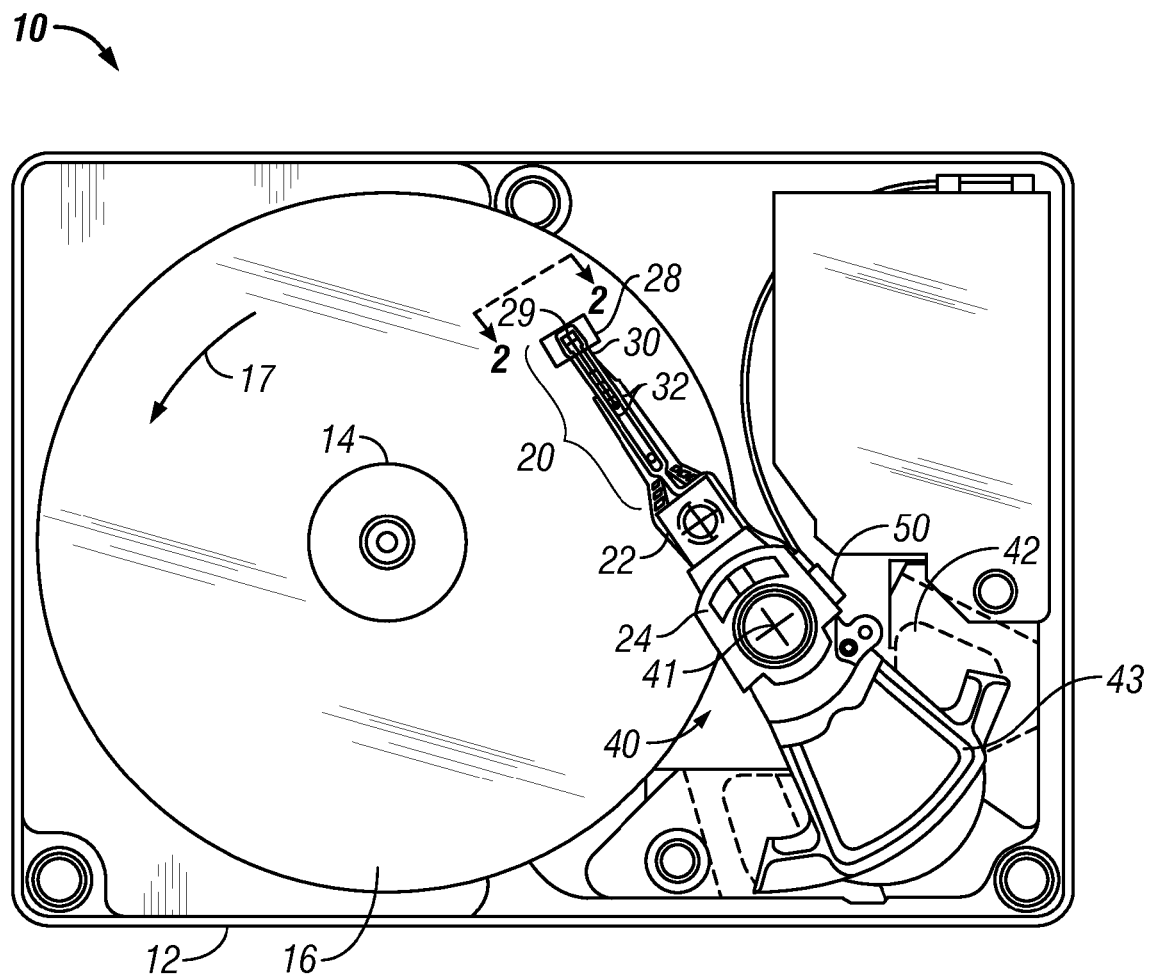
FIG. 1 is a top plan view of a head/disk assembly of a hard disk drive.

FIG. 1 is a top plan view of a head/disk assembly of a hard disk drive 10 with the cover removed. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to an air-bearing slider 28. A magnetic recording read/write head 29 is located at the end or trailing surface 25 of slider 28. The flexure 30 enables the slider 28 to "pitch" and "roll" on an air-bearing generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2:
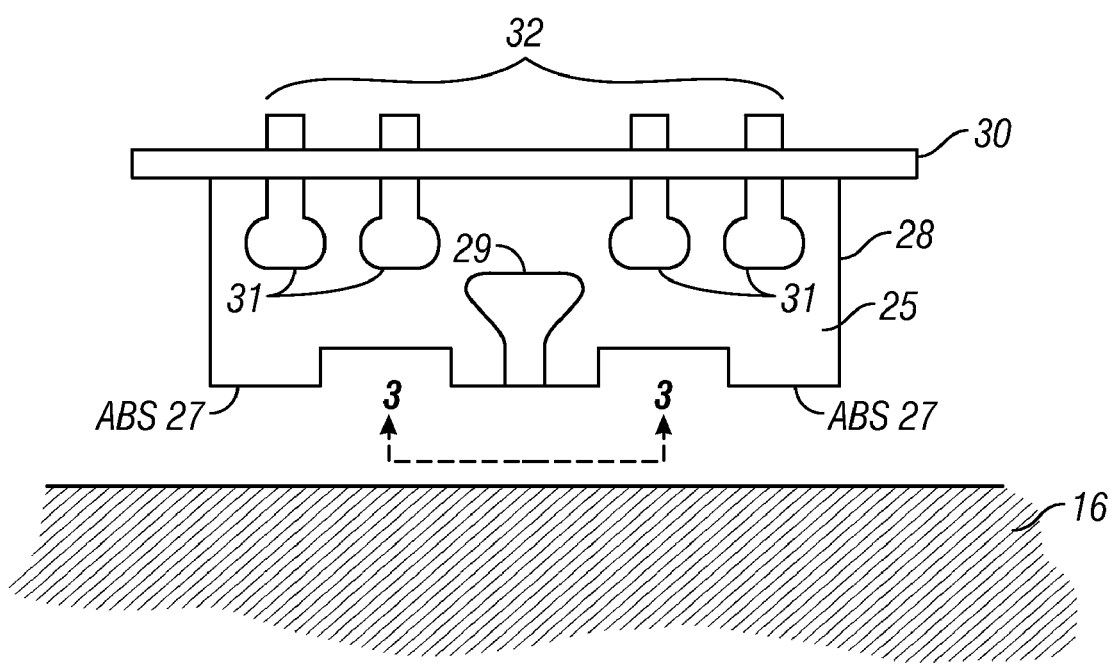
FIG. 2 is an enlarged end view of the slider and a section of the disk taken in the direction 2-2 in FIG. 1.

FIG. 2 is an enlarged end view of the slider 28 and a section of the disk 16 taken in the direction 2-2 in FIG. 1. The slider 28 is attached to flexure 30 and has an air-bearing surface (ABS) 27 facing the disk 16 and an end or trailing surface 25 generally perpendicular to the ABS 27. The ABS 27 causes the airflow from the rotating disk 16 to generate a bearing of air that supports the slider 28 in very close proximity to or near contact with the surface of disk 16. The read/write head 29 is formed as a series of thin films deposited on the slider 28 on its trailing surface 25. Typically a layer of insulating material, like alumina, is deposited over the read/write head 29 and serves as the outer surface of slider 28. The read/write head 29 is connected to terminal pads 31. The terminal pads 31 connect to the trace array 32 on flexure 30 for electrical connection to the read preamplifier and write driver in chip 50 (FIG. 1).

Figure 3:
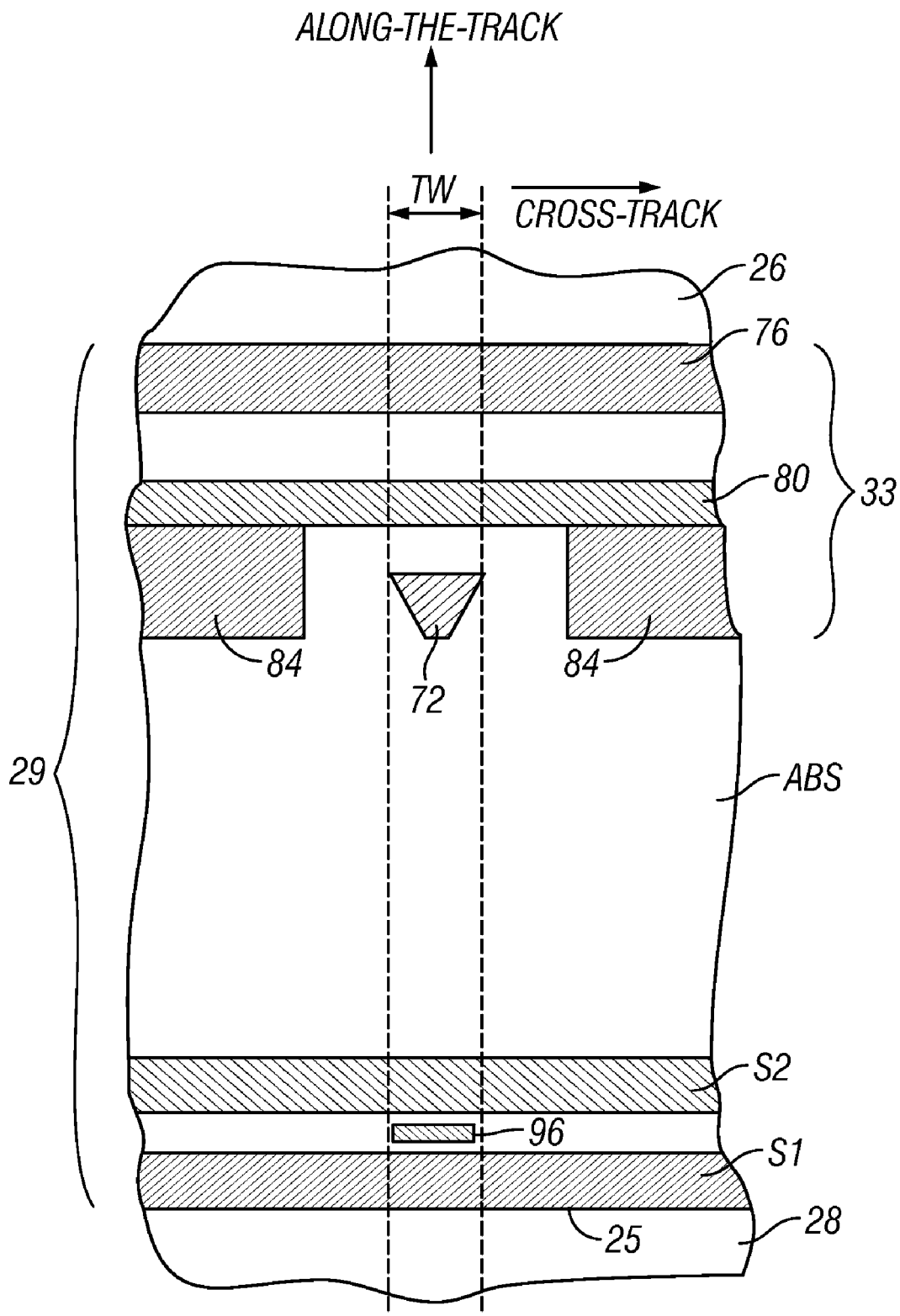
FIG. 3 is a view in the direction 3-3 of FIG. 2 and shows the ends of the read/write head as viewed from the disk.

FIG. 3 is a view in the direction 3-3 of FIG. 2 and shows the ends of read/write head 29 as viewed from the disk 16. The read/write head 29 includes a read head 96 and a write head 33 that are formed as a series of thin films deposited and lithographically patterned on the trailing surface 25 of slider 28, with the films of the read head being deposited first and the films of the write head being deposited over the read head. The magnetoresistive read sensor or head 96 is located between two magnetic shields S1 and S2, with first shield S1 being located on trailing surface 25. The write head 33 has a perpendicular write head and includes magnetic write pole (WP) with WP tip 72 and flux return pole 76. The WP tip 72 may be generally surrounded at the ABS by optional side shields 84 and trailing shield 80. The trailing shield 80 and side shields 84 may be connected to form a wraparound shield (WAS). The WAS is described in detail as a shield for a conventional perpendicular recording head in U.S. Pat. No. 7,002,775 B2 assigned to the same assignee as this application. The WAS, which is separated from the WP tip 72 by nonmagnetic gap material, alters the angle of the write field and improves the write field gradient at the point of writing, and also shields the writing field at regions of the disk away from the track being written. The shields S1, S2 for the read head 96 and the shields 80, 84 for the WP tip 72 are formed of magnetically permeable material. A layer of insulating material, like alumina, is deposited over the write head 33, resulting in an outer surface 26. The width of the WP tip 72 and the read head 96 in the cross-track direction correspond generally to the trackwidth (TW) of the data tracks on the disk 16.

Figures 4A, 4B:
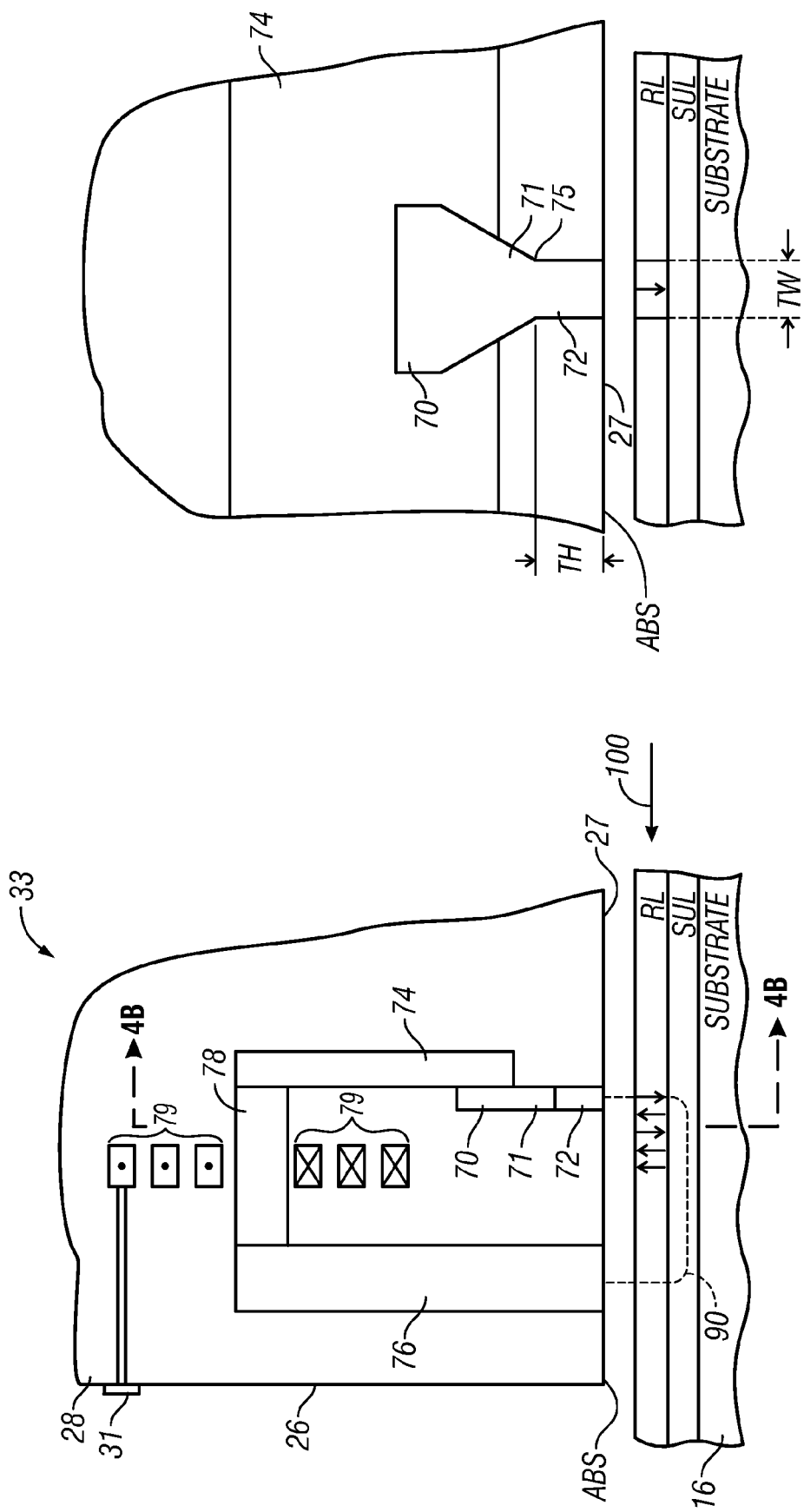
FIG. 4A is a sectional view of a portion of a slider showing a prior art perpendicular write head with a pancake coil and a portion of a perpendicular magnetic recording disk.
FIG. 4B is a view in the direction 4B-4B of FIG. 4A and illustrates the flare region of the flared write pole for the perpendicular write head.

FIG. 4A is a sectional view of a portion of slider 28 showing the perpendicular write head 33 and a portion of a perpendicular magnetic recording disk 16. The disk 16 includes a perpendicular magnetic data recording layer (RL) on a "soft" or relatively low-coercivity magnetically permeable underlayer (SUL) formed on the disk substrate. The write head 33 includes a yoke made up of the main pole 74, flux return pole 76, and yoke stud 78 connecting the main pole 74 and flux return pole 76; and a thin film "pancake" coil 79 shown as sections wrapped around yoke stud 78. The return pole 76 and yoke stud 78 are formed of soft ferromagnetic material, such as alloys of NiFe, CoFe and NiFeCo that are typically formed by electroplating. The write head 33 in FIG. 4A is depicted without the optional WAS (FIG. 3). The coil 79 is connected to terminals, such as terminal 31, on the outer surface 26 of slider 28. A flared write pole (WP) 70 is part of the main pole 74 and has a flared portion 71 and a pole tip 72 that faces the surface of disk 16. The WP 70 is formed of a high-moment material, such as a high-moment CoFe alloy, that is typically formed by sputter deposition, and may be a laminated structure. Write current through the thin film coil 79 induces a magnetic field (shown by dashed line 90) from the flared WP 70 that passes through the data RL (to magnetize the region of the RL beneath the WP 70), through the flux return path provided by the SUL, and back to the return pole 76. The slider 28 has its air-bearing surface (ABS) 27 supported above the surface of disk 16 as the disk 16 moves past the write head 33 in the direction indicated by arrow 100. The RL is illustrated with a perpendicularly recorded or magnetized region representing data adjacent to the pole tip 72. Preceding regions are shown having random prerecorded magnetization directions, as represented by the arrows. The magnetic transitions are detectable by the read head (not shown in FIG. 4A) as the recorded bits. The write coil 79 is called a "pancake" coil because it is deposited and patterned on the trailing end of the slider as essentially a single layer and thus all of the coil turns lie in substantially the same plane. When write current from the write driver in chip 50 (FIG. 1) is directed to coil 79 in one direction, for example in FIG. 4A out of the paper in the upper coil sections 79 with dots and into the paper in the lower coil sections 79 with the Xs, the region of the RL beneath the WP tip 72 is magnetized in one direction, down or into the disk in FIG. 4A. When the write driver switches the direction of the write current to coil 79, the region of the RL beneath the WP tip 72 is magnetized in the opposite direction, i.e., up or out of the disk in FIG. 4A.

FIG. 4B is a view in the direction 4B-4B of FIG. 4A and illustrates the flare region 71 of the flared WP 70. The region between the WP tip 72 and the flare portion 71 is called the flare point 75. The flare point 75 of the WP 70 is sometimes referred to as the "choke" point because it is the point where the flux density is highest and where the WP 70 saturates. The WP tip 72 has its primary or perpendicular axis oriented perpendicular to the ABS and has a "height" or distance from the ABS to flare point 75 called the throat height (TH). As shown in FIG. 4B, the two side walls of WP tip 72 define its width in the cross-track direction, which substantially defines the trackwidth (TW) of the data recorded in the RL of disk 16.

Figure 5:
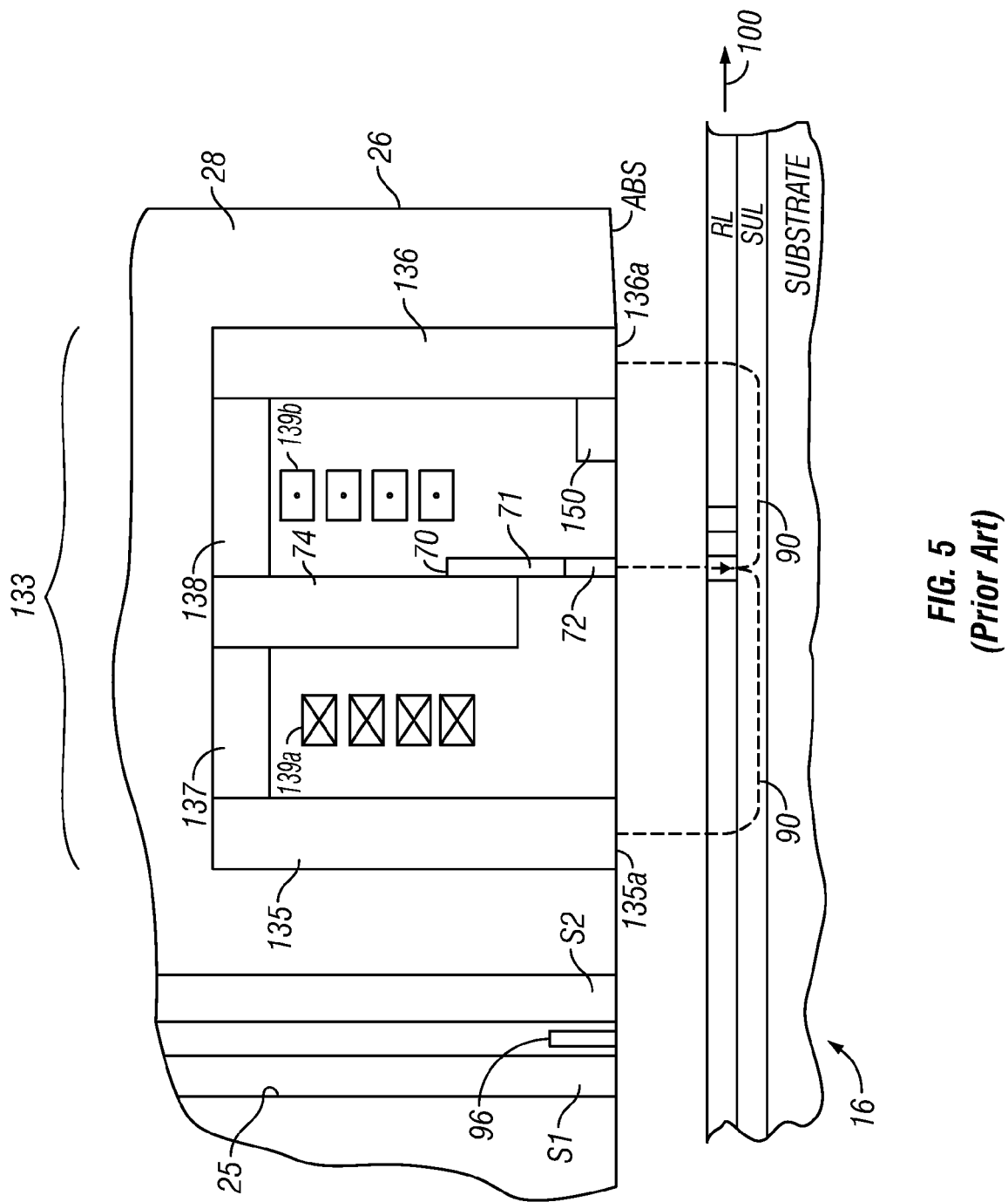
FIG. 5 is a side sectional view of a portion of a slider showing a read head, a prior art perpendicular write head with a helical coil, and a perpendicular magnetic recording disk.

The perpendicular write head of FIG. 4A has a "pancake" coil 79, wherein all the sections of coil 79 are deposited in the same process steps on the slider 28 so that the coil 79 lies in substantially a single plane. FIG. 5 shows slider 28 with trailing surface 25, outer surface 26 and a read head 96 between shields S1, S2 like that in FIGS. 4A-4B, but wherein the perpendicular write head 133 has a thin film "helical" coil (shown with coil sections 139a, 139b) wrapped around the main pole 74. A perpendicular write head with a helical coil is described in US 2008/0186628 A1 assigned to the same assignee as this application. The write head 133 is formed on slider 28 having an outer surface 26 and also includes a yoke made up of the main pole 74, a shield layer 135, and connection stud 137 to the main pole 74. Pole 136 is the return path for the magnetic flux 90 and is connected to trailing shield 150, which may be part of a WAS. Return pole 136 has a yoke stud 138 that connects the return pole 136 to the main pole 74. A flared WP 70 is part of the main pole 74 and has a flared portion 71 and a WP tip 72 like that shown in FIGS. 4A-4B. Write current through coil 139a, 139b induces a magnetic field (shown by dashed line 90) from the WP 70 that passes through the RL (to magnetize the region of the RL beneath the WP tip 72), through the flux return path provided by the SUL, and back to the return pole 136. The end of WP tip 72 is located substantially at the ABS, and the return pole 136 has an end 136a that is located substantially at the ABS and thus generally coplanar with end WP tip 72.

In this invention a transverse auxiliary pole (TAP) is used to inject auxiliary magnetic flux into the main pole at an angle, preferably substantially orthogonal, to the primary axis of the main pole. The write flux from the main pole flows in a direction perpendicular to the ABS, either toward or away from the RL, depending on the direction of write current in the main coil. The additional flux from the TAP, which is injected non-parallel to the primary magnetization of the main pole, exerts a torque on the magnetization of the main pole, thereby facilitating a precession of the magnetization reversal of the main pole.

Figure 6A:
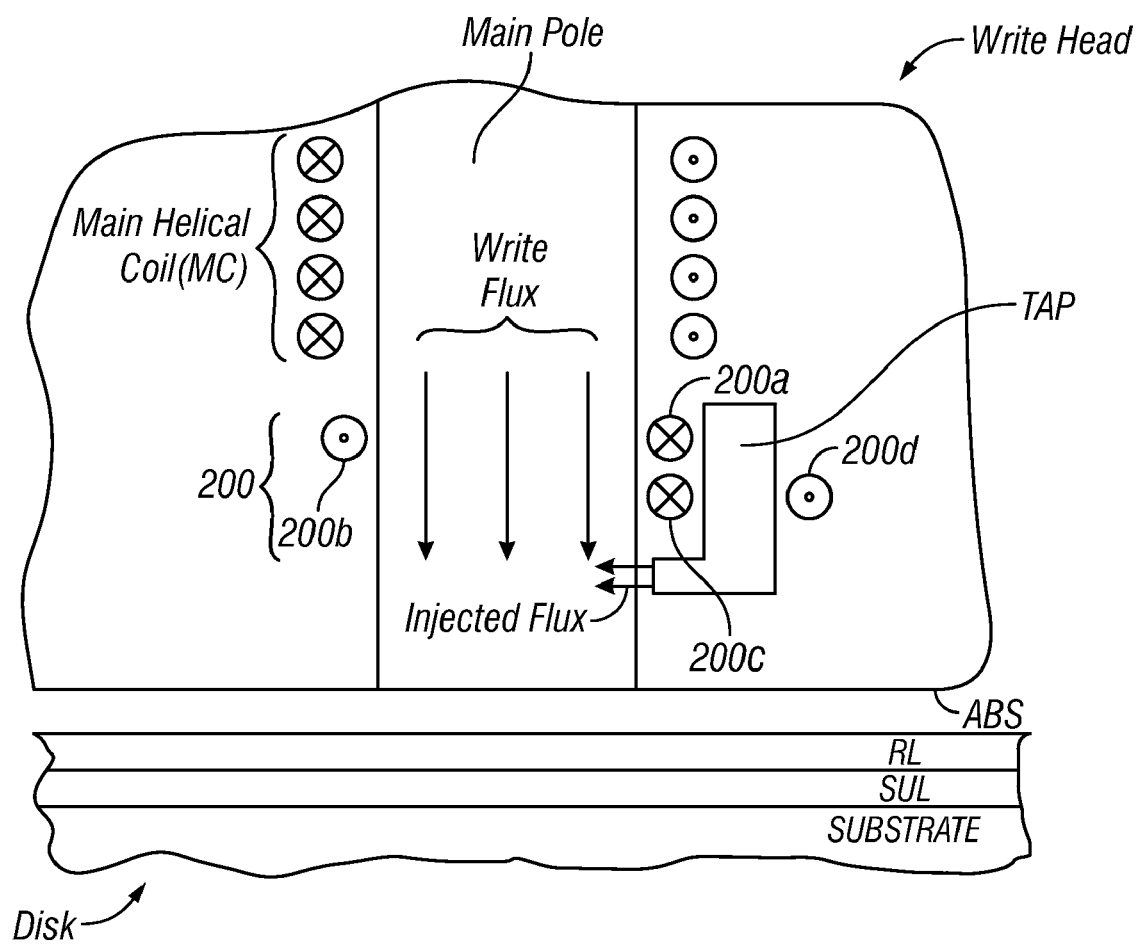
FIG. 6A is a schematic illustrating the basic concept of one embodiment of the invention showing the main coil (MC) with main pole and transverse auxiliary pole (TAP) coupled to the main pole by a separate passive coil or winding.

The basic concept of the invention is shown in one embodiment in FIG. 6A, which illustrates the main coil (MC) and main pole with write flux directed perpendicular to the RL of the disk and the TAP magnetically coupled to the MC. The TAP generates auxiliary flux directed at an angle (greater than 15 degrees) and preferably substantially orthogonal (70 to 90 degrees) to the main pole. In this embodiment an auxiliary passive conductive winding or coil 200, shown by sections 200a-200b, is separate from the MC and is wrapped as a loop around the main pole and the TAP. Coil section 200a connects to section 200b behind the main pole, coil section 200b connects to coil section 200c in front of the main pole, coil section 200c connects to coil section 200d behind the TAP, and coil section 200d connects to coil section 200a in front of the TAP. The write flux in the main pole induces a current in auxiliary coil 200, which induces an auxiliary magnetic field in the TAP. This results in the auxiliary flux injected substantially orthogonal to the main pole. The TAP may be formed of a high-moment material, preferably a high-moment CoFe alloy, like that used for the write pole 70 (FIG. 5), or alternatively alloys of Ni and Fe, such as permalloy 45/55 or permalloy 80/20.

Because the TAP has a considerably smaller volume than the main pole, its added inductance is significantly smaller than that of the main pole. Also, because the propagation of the main flux in the main write pole is relatively slower as compared to the rise time of the current in the MC, the magnetization or magnetic polarization of the main pole at the ABS lags behind the auxiliary field from the TAP. For example, the rise time of the current in the MC may be on the order of 100 picoseconds (ps), while magnetization can be on the order of 300-600 ps for the main flux in the main pole to reach its maximum value. Thus the auxiliary field from the TAP precedes the write field from the main pole by a time interval on the order of about several hundred ps and thus preconditions the magnetization in the main pole at an angle relative to the direction of the main flux. When the main flux arrives, the magnetization of the main pole is able to switch more quickly because it will experience a larger torque from the main flux due to the tilt angle relative to the direction orthogonal to the ABS due to the auxiliary flux injected by the TAP.

Figure 6B:
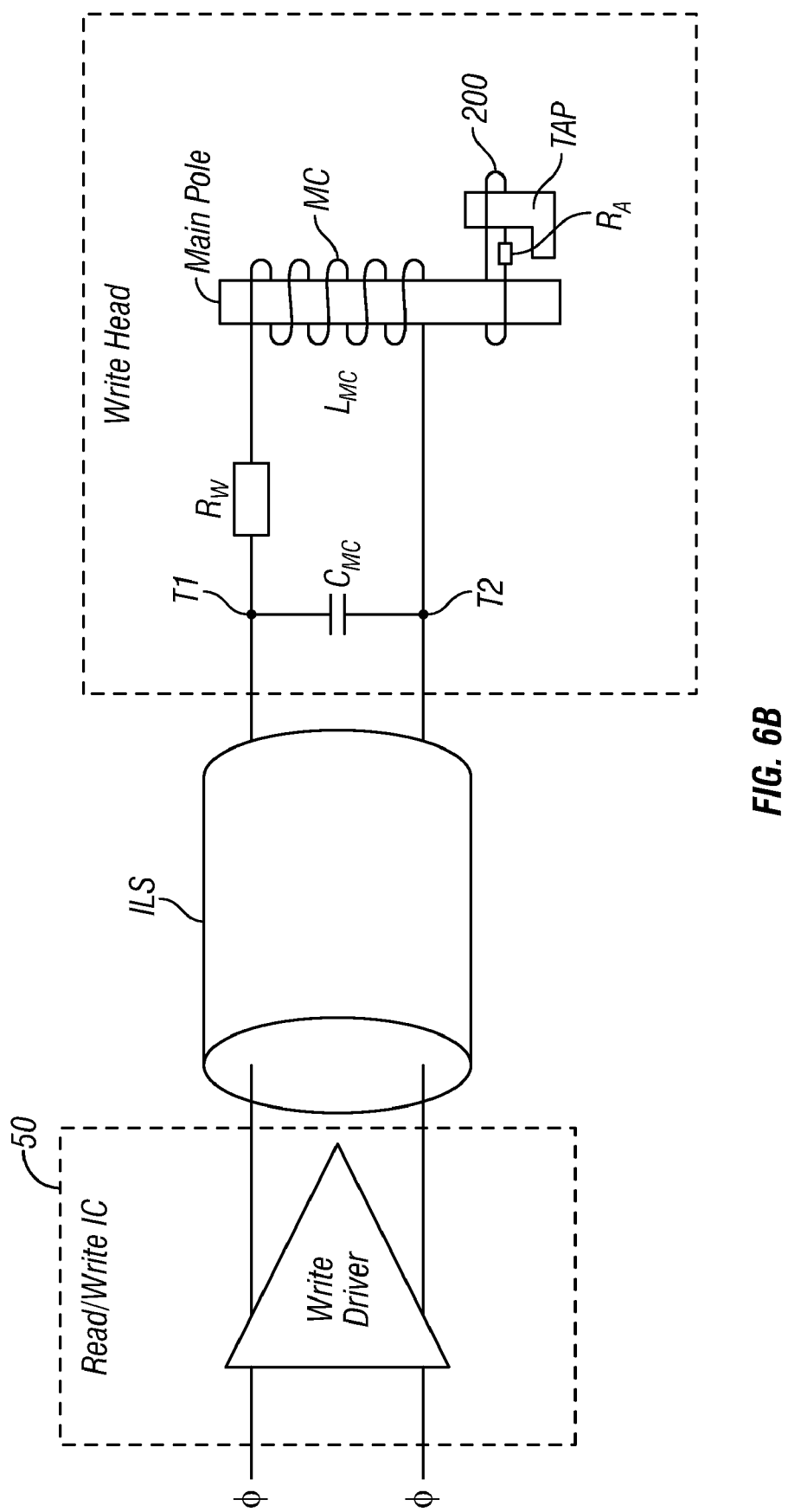
FIG. 6B shows the connection of the write driver to the write head and the connection of the TAP to the MC for the embodiment of FIG. 6A.
Figure 6C:
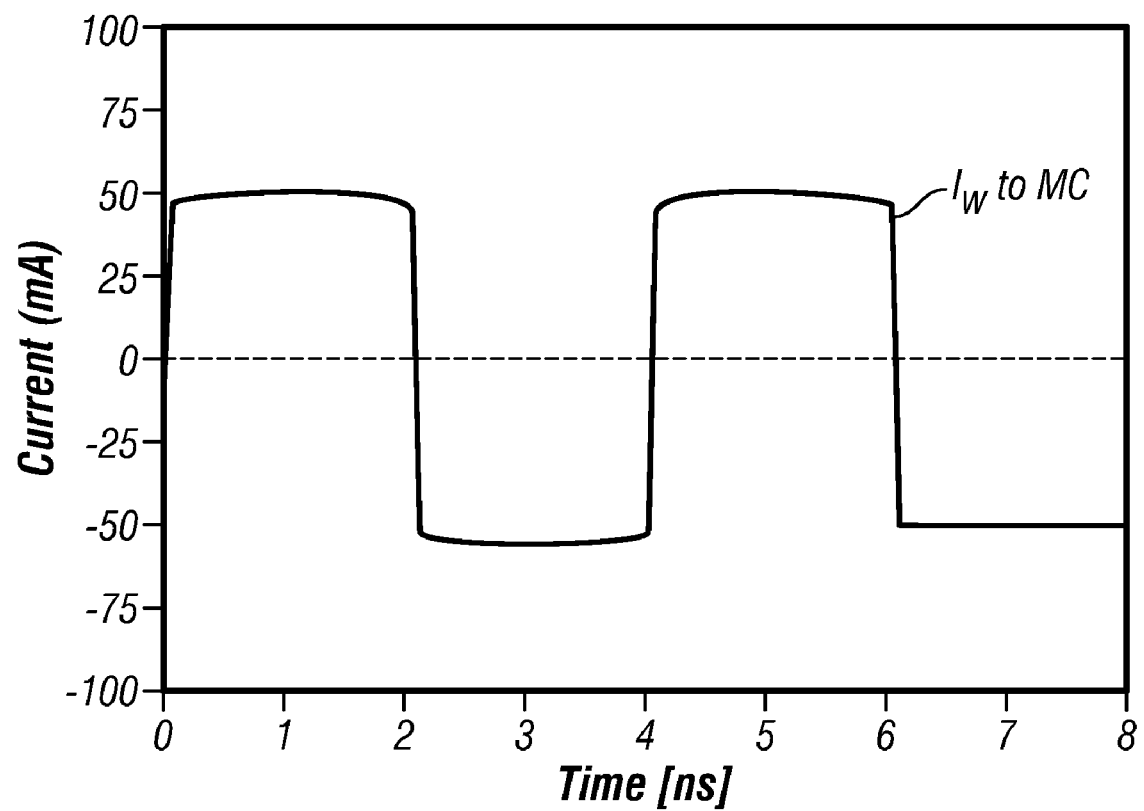
FIG. 6C is a graph of the write current ($I_w$) to the MC as a function of time.

FIG. 6B shows the electrical circuitry connected to the main coil (MC), the TAP and the loop around the main pole and the TAP for generating the auxiliary flux that facilitates the switching of the magnetization of the main pole for the embodiment of FIG. 6A. The write driver circuitry is in the read/write integrated circuit of chip 50 (FIG. 1) that is located away from the slider, typically on the E-block 24 (FIG. 1). The write driver is connected via interconnect lines on the integrated lead suspension (ILS) to the MC at terminals T1, T2. The write head has a resistance $R_w$, the MC has an inductance LMC, and the term CMC represents the parasitic capacitance. The coil 200 is not connected to the MC and is wound around the main pole and the TAP. The resistor $R_A$ represents a resistor whose value can be selected to adjust or tune the current that passes around the TAP and induces an auxiliary field. $R_A$ can be selected by use of a separate resistor patterned on the slider during fabrication of the coil 200 or by selecting the dimensions and/or resistivity of the conductive material of the coil 200. FIG. 6C is a graph of the write current ($I_w$) to the MC as a function of time for a typical write head. In this example, the write current is depicted as switching from +50 mA to −50 mA at a frequency of 250 MHz, which corresponds to a maximum data rate of 500 Mb/sec.

Figure 7A:
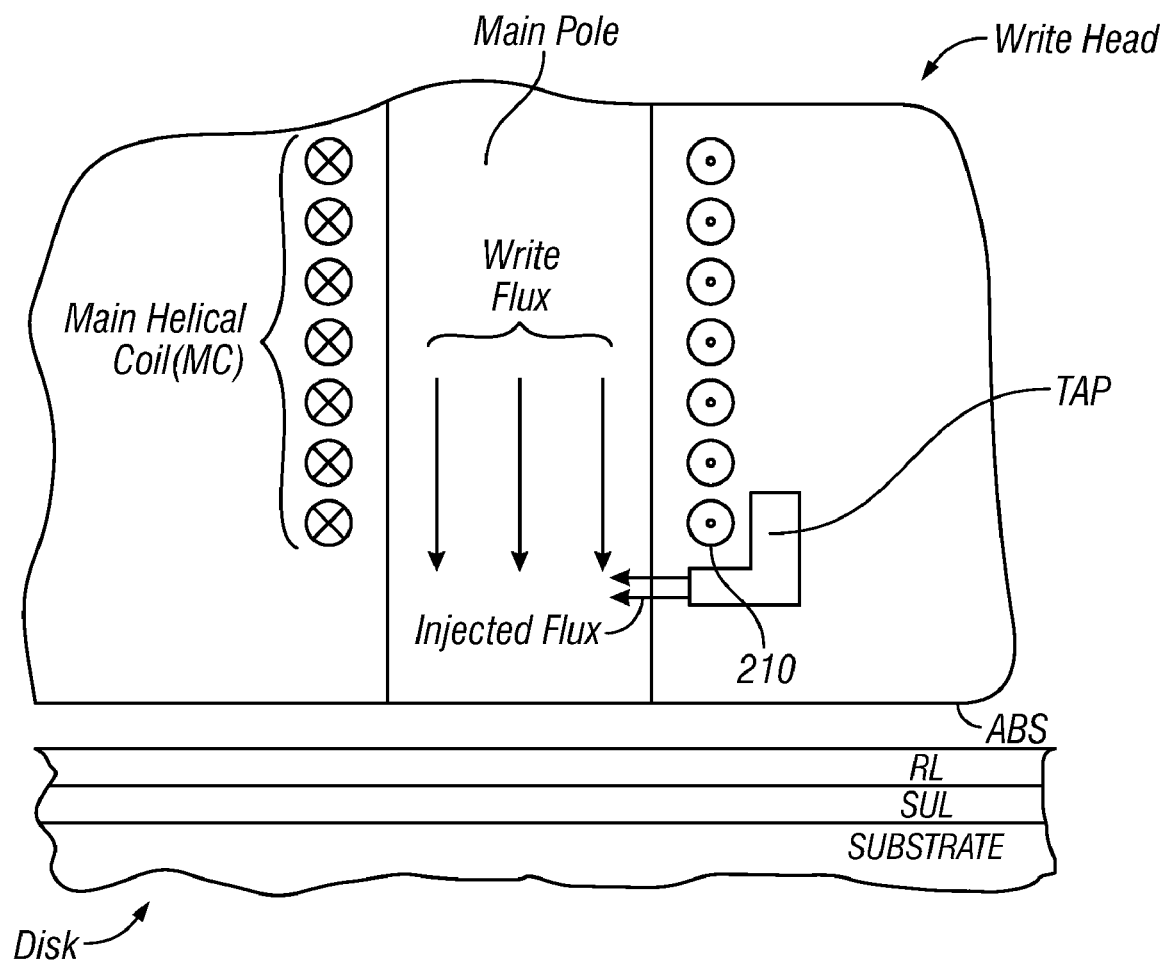
FIG. 7A is a schematic illustrating the basic concept of another embodiment of the invention showing a main coil (MC) with main pole and transverse auxiliary pole (TAP) located near one of the conductive turns of the MC.
Figure 7B:
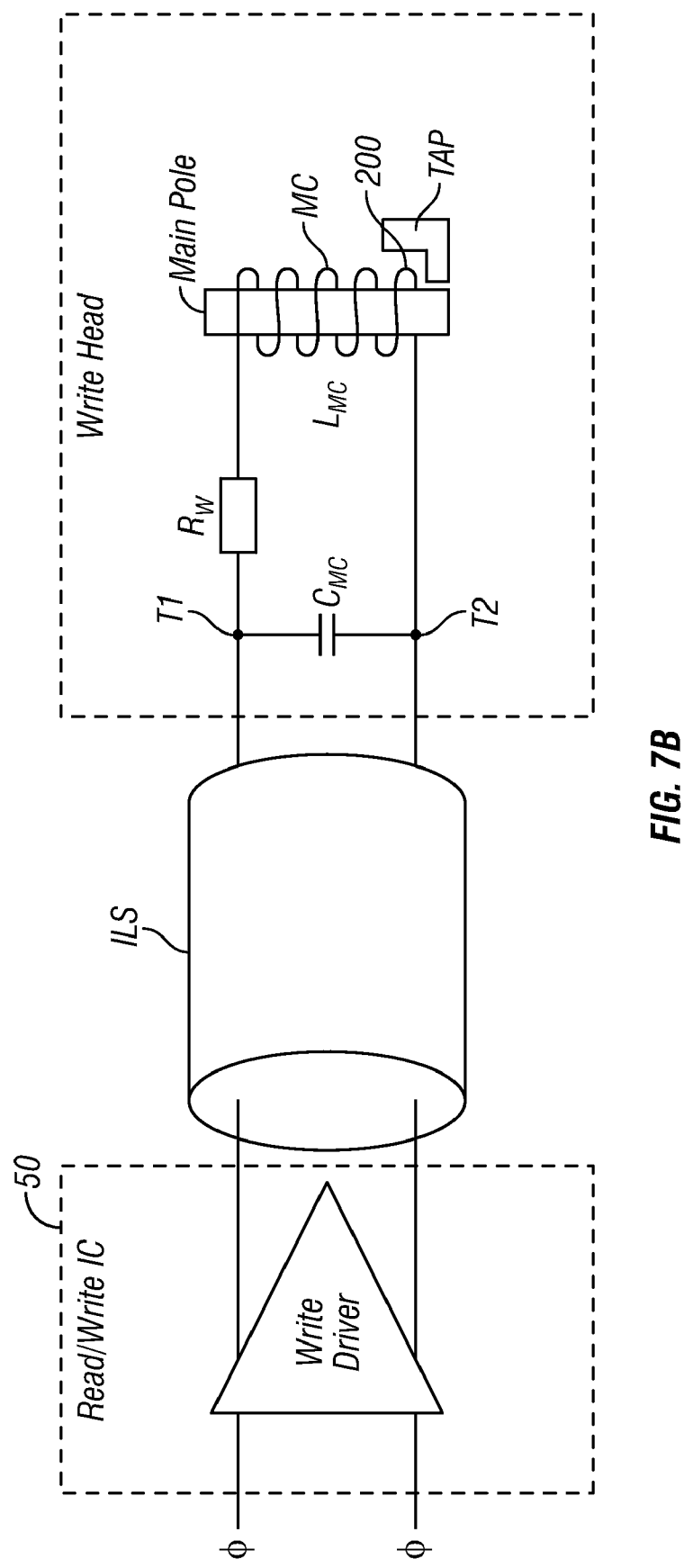
FIG. 7B shows the connection of the write driver to the write head and the TAP located near the MC for the embodiment of FIG. 7A.

FIG. 7A illustrates another embodiment of the invention. In this embodiment the TAP is located in close proximity to one of the conductive turns of the multiple-turn MC, preferably the turn 210 located closest to the ABS, and is thus magnetically coupled to the MC but not electrically connected to the MC. As write current is driven into the MC, the field that arises from the current in the nearby conductive turn (called the "Amperian" field) is directed to the TAP. In this embodiment, the TAP essentially functions as a flux guide to direct the Amperian field to the main pole. In this embodiment the TAP may be formed of the same material as described for the embodiment of FIG. 6A. Because the TAP has a considerably smaller volume than the main pole, its inductance is significantly smaller than that of the main pole. Also, because the propagation of the main flux is relatively slower as compared to the rise time of the current in the MC, the magnetization or magnetic polarization of the main pole at the ABS lags behind the auxiliary field from the TAP. For example, the rise time of the current in the MC may be on the order of 100 picoseconds (ps), while it takes on the order of the 300-600 ps for the main flux in the main pole to reach its maximum value. Thus the auxiliary field from the TAP precedes the write field from the main pole by a time interval on the order of several hundred ps and thus preconditions the magnetization in the main pole at a large angle relative to the direction of the main flux. When the main flux arrives, the magnetization of the main pole is able to switch more quickly. FIG. 7B shows the electrical circuitry connected to the main coil (MC), and the TAP located near one of the turns of the MC, for generating the auxiliary flux that facilitates the switching of the magnetization of the main pole for the embodiment of FIG. 7A.

Ferromagnetic resonance arises from the precessional motion of the magnetic material of the write pole in the presence of the auxiliary magnetic field from the auxiliary coil. The auxiliary magnetic field puts a torque on the magnetization of the magnetic material of the write pole which causes the magnetic moment to process. The resonant frequency of the ferromagnetic precession depends on the material properties, including magnetic anisotropy and moment density and the shape of the magnetic structure. For example, for material used as write poles in conventional disk drive write heads, the ferromagnetic resonance frequency is typically in the range of 1-4 GHz. However, auxiliary fields with frequencies lower than the ferromagnetic resonance frequency will also contribute to the switching of the magnetization of the write pole when applied at appreciable angles relative to the main direction of the magnetic anisotropy of the write pole. If the auxiliary field is at a frequency less than the ferromagnetic resonance frequency, the beneficial effect of the auxiliary field on the switching of the magnetization of the write pole will be dominated by the increase of the magnetic reversal torque in proportion to $\sin(\theta)$, where $\theta$ is the angle between the local direction of the total field from the main and auxiliary coils and the local direction of the magnetization of the write pole. The proportionality of the magnetic torque to $\sin(\theta)$ also explains why the auxiliary field is useful not only at angles of 90 degrees but at lesser angles, preferably in the range of 15 to 90 degrees, relative to the write pole.

Figure 8:
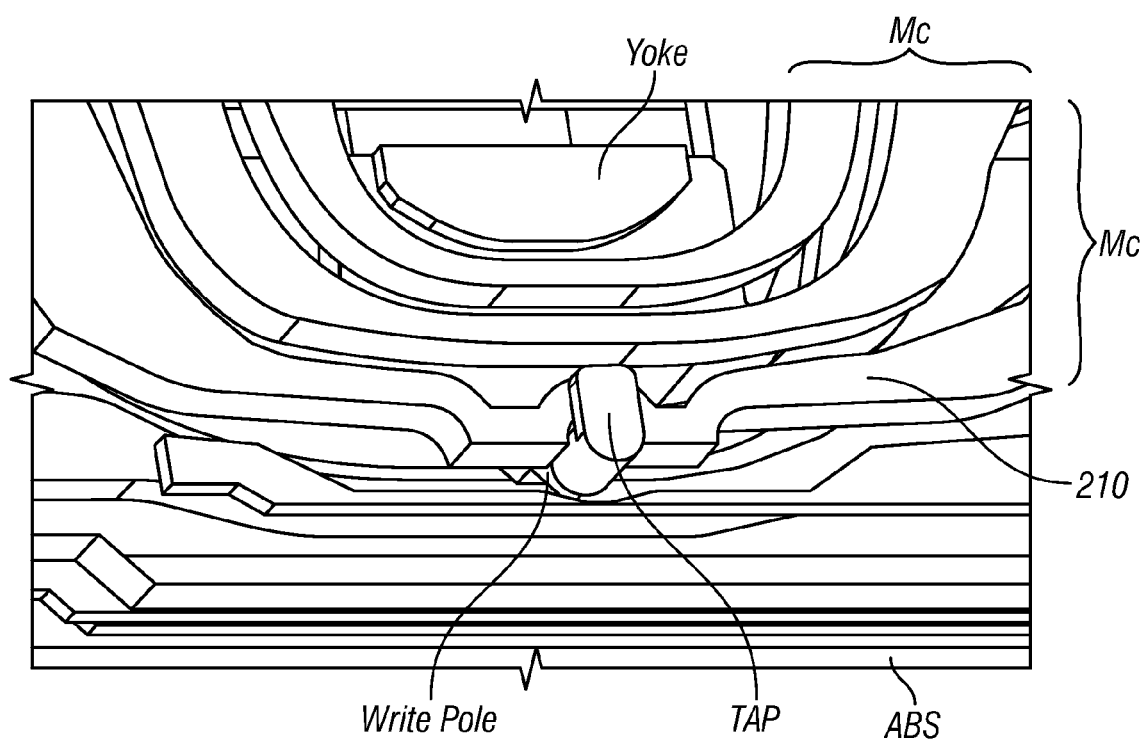
FIG. 8 is a perspective view of the embodiment of FIG. 7A, but with a write head having a pancake coil, and shows the TAP located near the coil turn located closest to the air-bearing surface (ABS) of a slider.

While the embodiments of FIGS. 6A and 7A are depicted with a helical MC, the invention is not limited by a specific write head structure. Rather, the invention may be implemented with any type of perpendicular write head having a TAP that directs auxiliary flux nonparallel to the write pole to facilitate the magnetization reversal of the write pole. These types of write heads include not only those with a helical coil, but also those with a pancake coil. FIG. 8 is a perspective view of the lower portion near the ABS of a perpendicular write head with a pancake coil, and illustrates the location of the TAP for the embodiment like that depicted in FIG. 7A. FIG. 8 is a view of the outer surface of the slider with the protective alumina overcoat removed to show the underlying features of the write head of the invention. The perspective view of FIG. 8 is a view of the design of an actual perpendicular write head, modified to include the TAP, and shows the various structures that are fabricated according to well-known lithographic and etching processes used for thin-film magnetic recording heads. The opening for the TAP near the turn of the MC closest to the ABS may be formed in the same masking step that is used to pattern the MC, after which the TAP can be sputtered deposited into the opening. As shown in FIG. 8, the main pole is located within the yoke and is connected to the write pole, whose end is near the ABS. The main pole and write pole are located beneath the MC. The MC has a conductive turn 210 near the ABS that passes over the TAP.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write system for magnetizing regions in a perpendicular magnetic recording layer comprising:
    a write head comprising
        a main pole;
        a main electrically conductive coil around the main pole for generating magnetic flux in the main pole;
        a transverse auxiliary pole (TAP) coupled to the main coil and oriented at an angle to the main pole greater than 15 degrees and less than or equal to 90 degrees; and
    a write driver capable of supplying write current to the main coil, the TAP directing magnetic flux to the main pole in response to the write current.

2. The system of claim 1 wherein the TAP is oriented substantially orthogonal to the main pole.

3. The system of claim 1 further comprising an auxiliary coil around the main pole and the TAP, the auxiliary coil not being electrically connected to the main coil.

4. The system of claim 1 wherein the main coil has multiple turns and wherein the TAP is located near one of the turns of the main coil.

5. The system of claim 1 wherein the main coil is a pancake coil.

6. The system of claim 1 wherein the main coil is a helical coil.

7. A magnetic recording disk drive perpendicular recording write head for magnetizing regions in data tracks of a perpendicular magnetic recording layer on the disk, the write head being formed on a slider having an air-bearing surface (ABS) facing the recording layer and comprising:
    a substrate;
    a main pole on the substrate;
    a write pole on the main pole and having an end substantially at the ABS;
    a main electrically conductive coil around the main pole for generating magnetic flux in the main pole and its connected write pole; and
    a transverse auxiliary pole (TAP) magnetically coupled to the main coil and oriented substantially orthogonal to the write pole.

8. The write head of claim 7 further comprising an auxiliary coil around the main pole and the TAP, the auxiliary coil not being electrically connected to the main coil.

9. The write head of claim 7 wherein the main coil has multiple turns and wherein the TAP is located near the turn closest to the ABS.

10. The write head of claim 7 wherein the main coil is a pancake coil.

11. The write head of claim 7 wherein the main coil is a helical coil.

12. A magnetic recording disk drive perpendicular recording write system comprising:
 the write head of claim 7; and
 a write driver for supplying write current to the main coil, whereby the TAP generates magnetic flux substantially orthogonal to the write pole in response to write current from the write driver.

\* \* \* \* \*